Feb. 20, 1951  L. E. FULLMER  2,542,865
WEIGHT-APPLIED, SOLENOID RELEASED BRAKE
Filed March 19, 1948
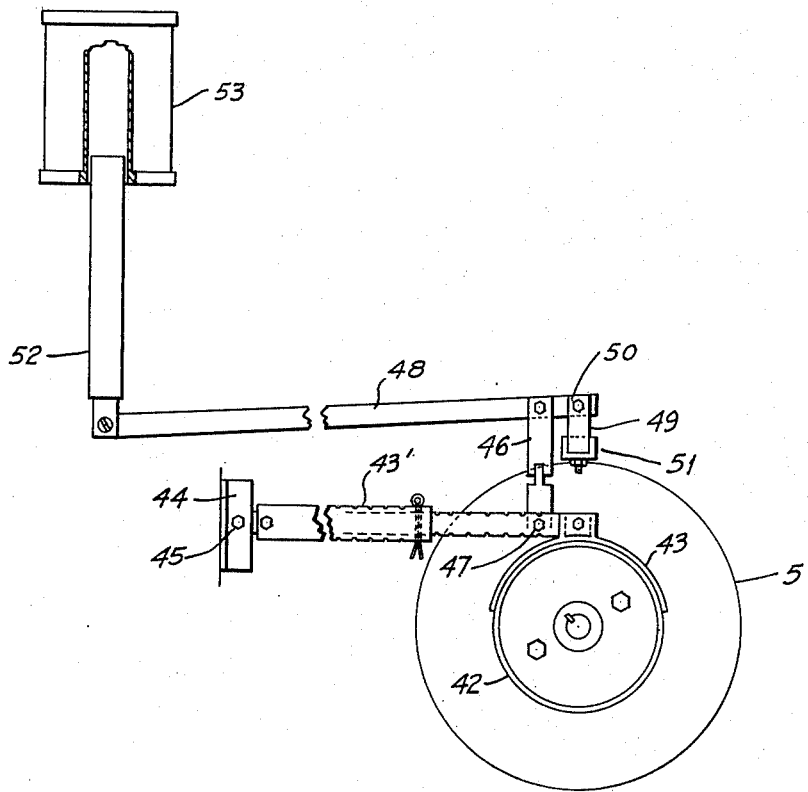
INVENTOR.
Lewis E. Fullmer
BY
A. Schapps
ATTORNEY Patented Feb. 20, 1951

2,542,865

UNITED STATES PATENT OFFICE 2,542,865

WEIGHT-APPLIED, SOLENOID RELEASED BRAKE

Lewis E. Fullmer, Salinas, Calif.

Application March 19, 1948, Serial No. 15,915

1 Claim. (Cl. 188—174)

The present invention relates to a weight-applied, solenoid released brake and its principal object is to provide a brake mechanism for a motor in which the weight of a plunger is used for setting the brake mechanism while a solenoid is employed to act on the plunger for releasing the brake.

It is further proposed to provide, in a brake of the character described, an operating mechanism between the plunger and the brake whereby a braking leverage is obtained greatly favoring the plunger, so as to allow a comparatively light plunger to exercise considerable braking action.

It is further proposed to provide an operating mechanism for the brake involving two relatively long levers disposed one above the other, the first lever having a fixed pivot at one end and having its other end pivoted to and bearing on the brake shoe, while the second lever has a fixed pivot above the brake shoe and has the plunger bearing down on its free end, with a link interposed between the levers and positioned for a most favorable lever action.

Further objects and advantages of my invention will appear as the specification proceeds, and the novel features of my invention will be fully defined in the claim attached hereto.

The preferred form of my invention is illustrated in the accompanying drawing, the sole figure of which shows an end view of a motor and the brake mechanism attached thereto.

While I have shown only the preferred form of my invention, I wish to have it understood that various changes and modifications may be made within the scope of the claim attached hereto without departing from the spirit of the invention.

Referring to the drawing in detail, the motor 5 is provided with a brake mechanism as illustrated in the drawing. The motor carries a brake wheel 42 upon which is mounted a brake shoe 43 pivoted to the end of an arm 43' pivoted to a fixed bracket 44, as at 45. The arm may be made extensible by the telescoping arrangement illustrated in the drawing.

The arm is operated by means of a link 46 pivoted to the outer end of the arm as at 47 and suspended from a lever 48 having its outer end pivoted in a fixed member 49, as at 50, the fixed member being supported in a channel 51 supported on the motor housing. The inner end of the lever 48 is pivoted to a plunger 52 of a solenoid 53. Normally the weight of the plunger sets the brake, but when the solenoid 53 is energized it pulls the plunger 52 upward and thereby releases the brake.

Since the weight of the plunger alone is relied on for setting the brake, it is apparent that a favorable leverage for the plunger is of great advantage, and such leverage is obtained by the structure shown, with its two relatively long levers and the interconnecting link connected to the upper lever near its pivot and to the lower lever near the brake.

I claim:

In combination, a motor having a brake drum thereon, a brake shoe for the drum, a relatively long and horizontally disposed lever having one end pivoted to a fixed support and having its free end pivoted to and resting on the brake shoe, a second horizontally disposed and relatively long lever having one end pivoted to a fixed support vertically above the brake shoe pivot and extending substantially parallel to the first lever, a plunger connected to the free end of the second lever for normally weighting the same, a link connecting the two levers and operable to set the brake under the weight of the plunger, and a solenoid operable for lifting the plunger to release the brake when the solenoid is energized, the link being pivoted to the first lever between the latter's fixed support and the brake shoe pivot and immediately adjacent the latter, and the link being pivoted to the second lever between the latter's fixed support and the plunger connection and immediately adjacent the fixed support to produce a braking leverage greatly favoring the plunger.

LEWIS E. FULLMER.

REFERENCES CITED

The following references are of record in the file of this patent:

UNITED STATES PATENTS

| Number | Name | Date |
|---|---|---|
| 750,261 | Cooley | Jan. 26, 1904 |
| 765,032 | Motz | July 12, 1904 |
| 1,582,198 | Walbridge | Apr. 27, 1926 |
| 1,661,719 | Edwards et al. | Mar. 6, 1928 |
| 1,745,990 | Goldman | Feb. 4, 1930 |
| 1,944,157 | Forman | Jan. 23, 1934 |
| 1,968,590 | Apple | July 31, 1934 |
| 2,164,958 | Stein | July 4, 1939 |
| 2,168,152 | Brauchler | Aug. 1, 1939 |
| 2,191,816 | Conley | Feb. 27, 1940 |